US010875716B2

(12) United States Patent
Schönenberger

(10) Patent No.: US 10,875,716 B2
(45) Date of Patent: Dec. 29, 2020

(54) HANGING BAG FRAME AND HANGING BAG

(71) Applicant: RSL Logistik GmbH & Co. KG, Landsberg am Lech (DE)

(72) Inventor: Rolf Schönenberger, Landsberg am Lech (DE)

(73) Assignee: RSL LOGISTIK GMBH & CO. KG, Landsberg am Lech (DE)

( * ) Notice: Subject to any disclaimer, the term of this patent is extended or adjusted under 35 U.S.C. 154(b) by 0 days.

(21) Appl. No.: 16/535,825

(22) Filed: Aug. 8, 2019

(65) Prior Publication Data
US 2020/0087073 A1  Mar. 19, 2020

(30) Foreign Application Priority Data
Aug. 10, 2018 (DE) .................. 10 2018 213 489

(51) Int. Cl.
*B65G 17/20*   (2006.01)
*B65G 17/32*   (2006.01)

(52) U.S. Cl.
CPC ............. *B65G 17/20* (2013.01); *B65G 17/32* (2013.01); *B65G 2201/0238* (2013.01)

(58) Field of Classification Search
CPC ................. B65G 17/20; B65G 17/32; B65G 2201/0238; B65D 33/24; B65D 33/1683; B65B 43/26; B65B 43/262; B65B 43/267
USPC ................ 198/690, 678.1; 53/50, 570, 384.1
See application file for complete search history.

(56) References Cited

U.S. PATENT DOCUMENTS

| 2,601,480 | A | * | 6/1952 | Williams | ................ B65B 43/36 53/370.2 |
| 2,755,908 | A | * | 7/1956 | Freeman | ............... B65G 47/482 198/352 |
| 2,798,586 | A | * | 7/1957 | Freeman | ............... B65G 47/482 198/352 |
| 3,789,573 | A | * | 2/1974 | Crabb | ..................... B65B 57/04 53/55 |

(Continued)

FOREIGN PATENT DOCUMENTS

| DE | 102012108757 A1 | 3/2014 |
| DE | 102017201919 A1 | 8/2018 |

(Continued)

OTHER PUBLICATIONS

German Application No. DE10 2018 213 489.8 Search Report dated Jun. 2, 2019, 8 pages.

(Continued)

*Primary Examiner* — James R Bidwell
(74) *Attorney, Agent, or Firm* — Kilpatrick Townsend & Stockton LLP

(57) ABSTRACT

The present invention relates to a hanging bag frame comprising: first and second side wall frames each having an upper and a lower frame part, a hinge mechanism having two pivot bearings, pivot bearing components, which pivotally support at least one of the two lower frame parts, a locking mechanism with at least one locking element, and a spreading mechanism adapted, during or after an adjustment of the at least one locking element from the locked position to the release position, with at least one locking element being provided or supported on one of the pivot bearings.

19 Claims, 13 Drawing Sheets

(56) References Cited

U.S. PATENT DOCUMENTS

| | | | | |
|---|---|---|---|---|
| 4,148,169 | A | * | 4/1979 | Zike ................. B65B 43/465 |
| | | | | 53/384.1 |
| 4,783,949 | A | * | 11/1988 | Chopko ................. B65B 9/14 |
| | | | | 493/309 |
| 5,125,500 | A | | 6/1992 | Cailbault |
| 5,351,465 | A | * | 10/1994 | Fortnam ................. B65B 43/34 |
| | | | | 53/384.1 |
| 6,282,871 | B1 | * | 9/2001 | Killinger ............ B65B 43/123 |
| | | | | 53/459 |
| 2010/0243409 | A1 | * | 9/2010 | Borkiewicz .......... A22C 15/001 |
| | | | | 198/465.4 |
| 2012/0152697 | A1 | * | 6/2012 | Janzen ................. B65G 47/61 |
| | | | | 198/680 |
| 2015/0217889 | A1 | * | 8/2015 | Nakamoto ........... B65B 43/465 |
| | | | | 198/678.1 |
| 2015/0225177 | A1 | * | 8/2015 | Schonenberger ...... B65G 17/20 |
| | | | | 198/687.1 |

FOREIGN PATENT DOCUMENTS

| | | | |
|---|---|---|---|
| EP | 1420105 | A1 | 5/2004 |
| EP | 2792620 | A1 | 10/2014 |
| EP | 3090967 | A2 | 4/2016 |
| JP | H07304514 | A | 11/1995 |

OTHER PUBLICATIONS

European Application No. EP19190956.3, Extended European Search Report dated Jan. 8, 2020, 5 pages.

* cited by examiner

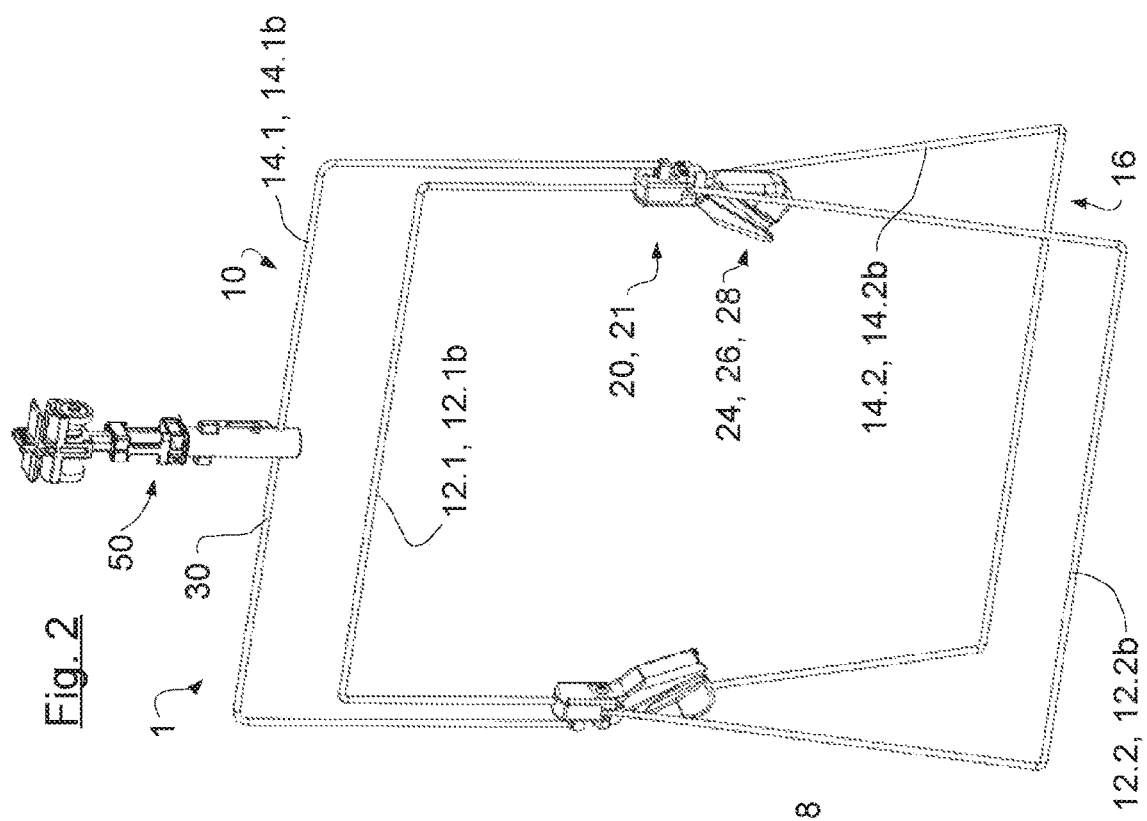
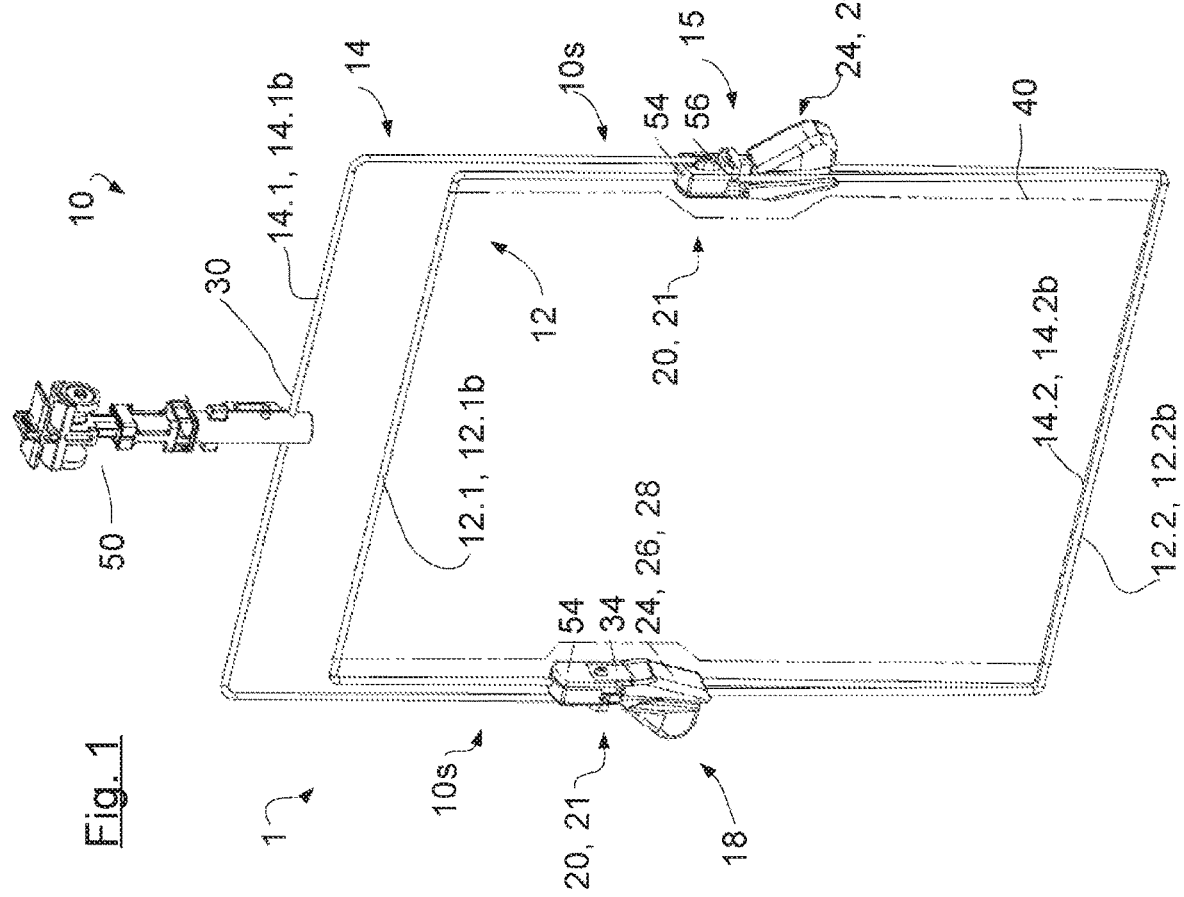

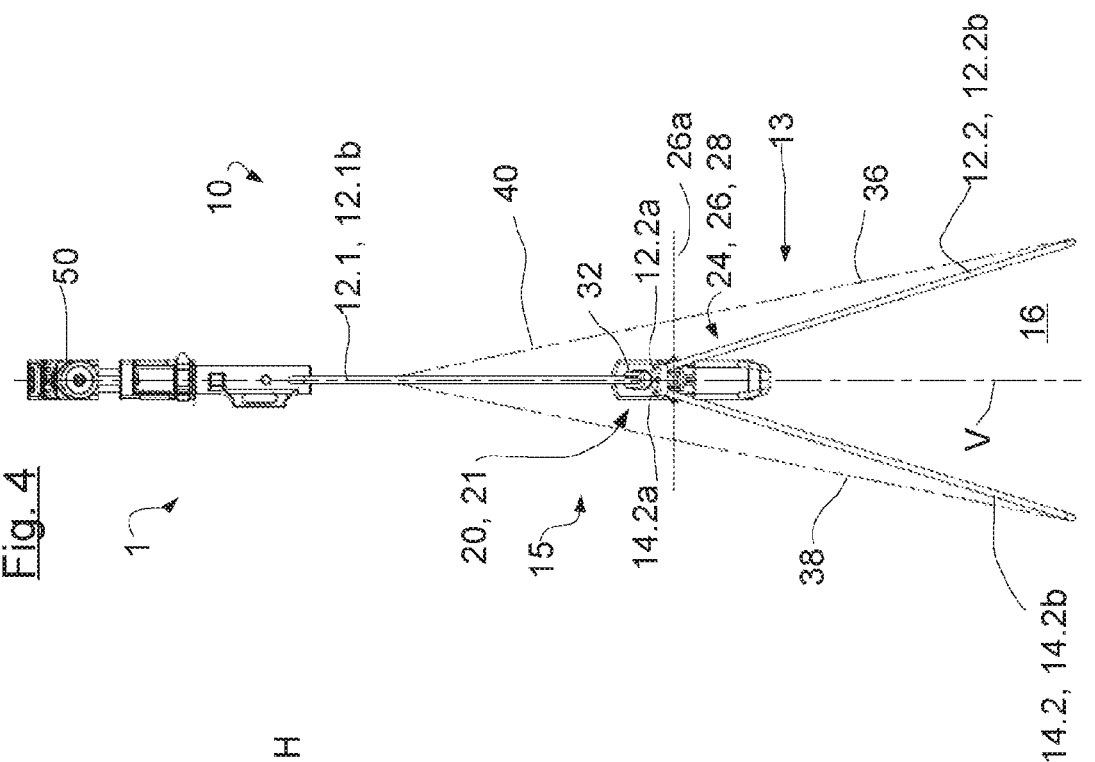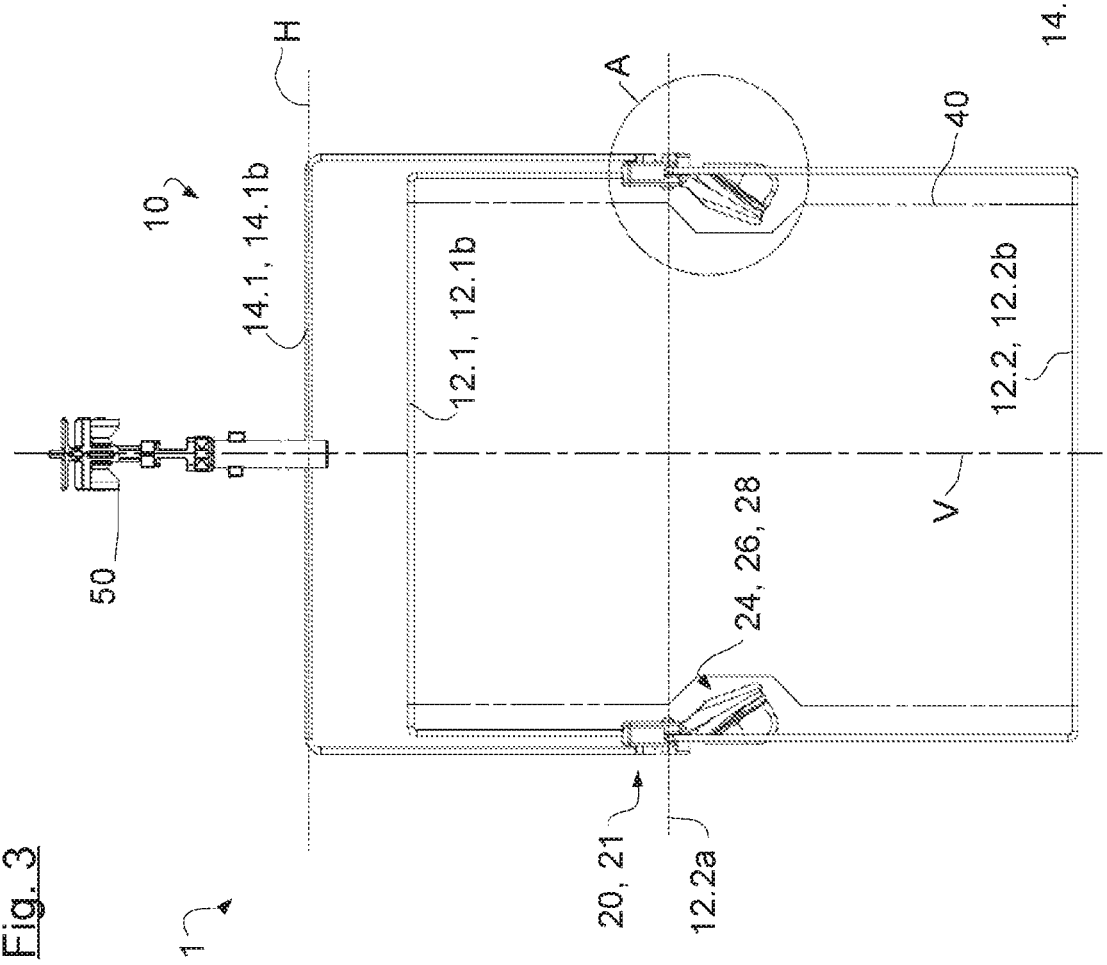

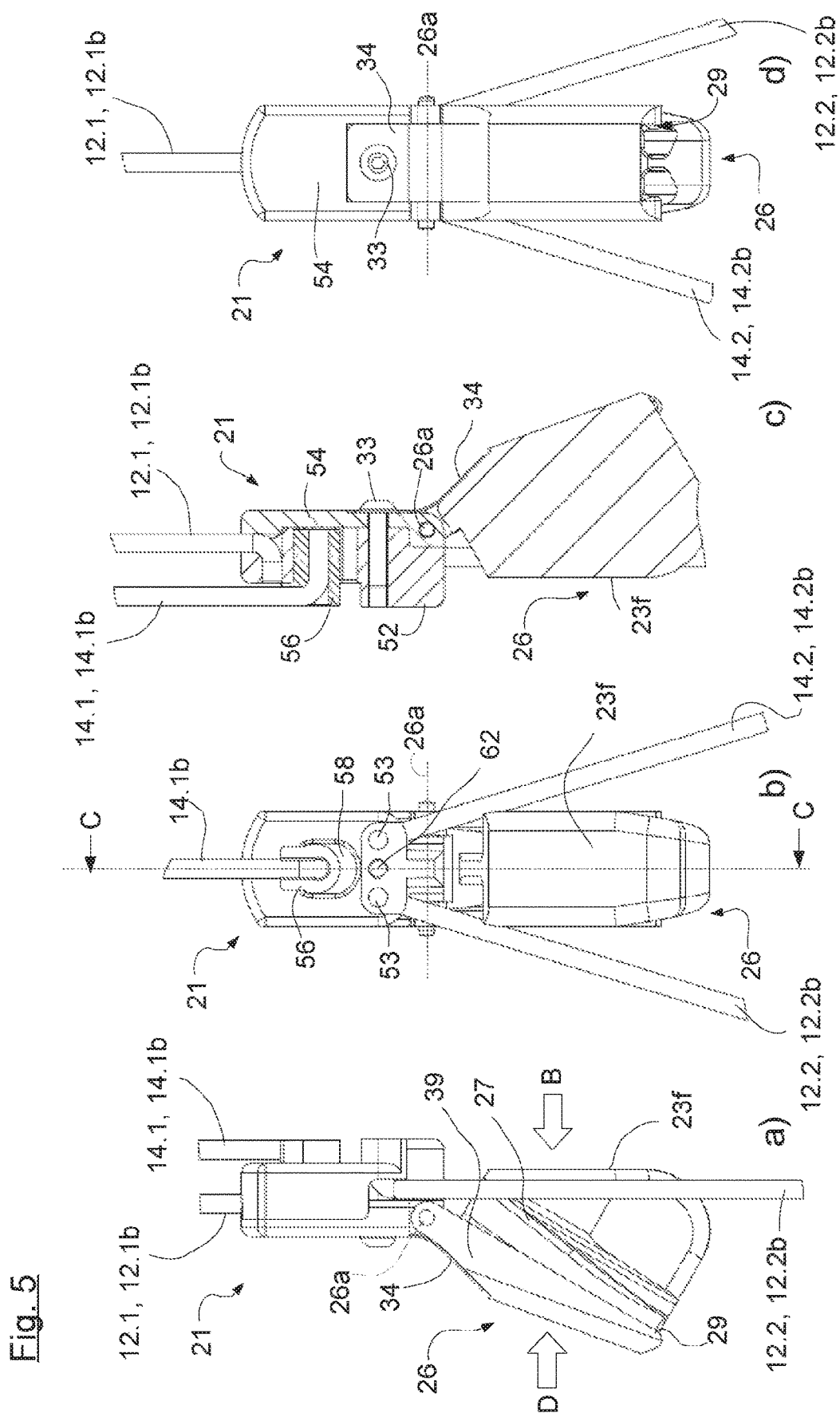

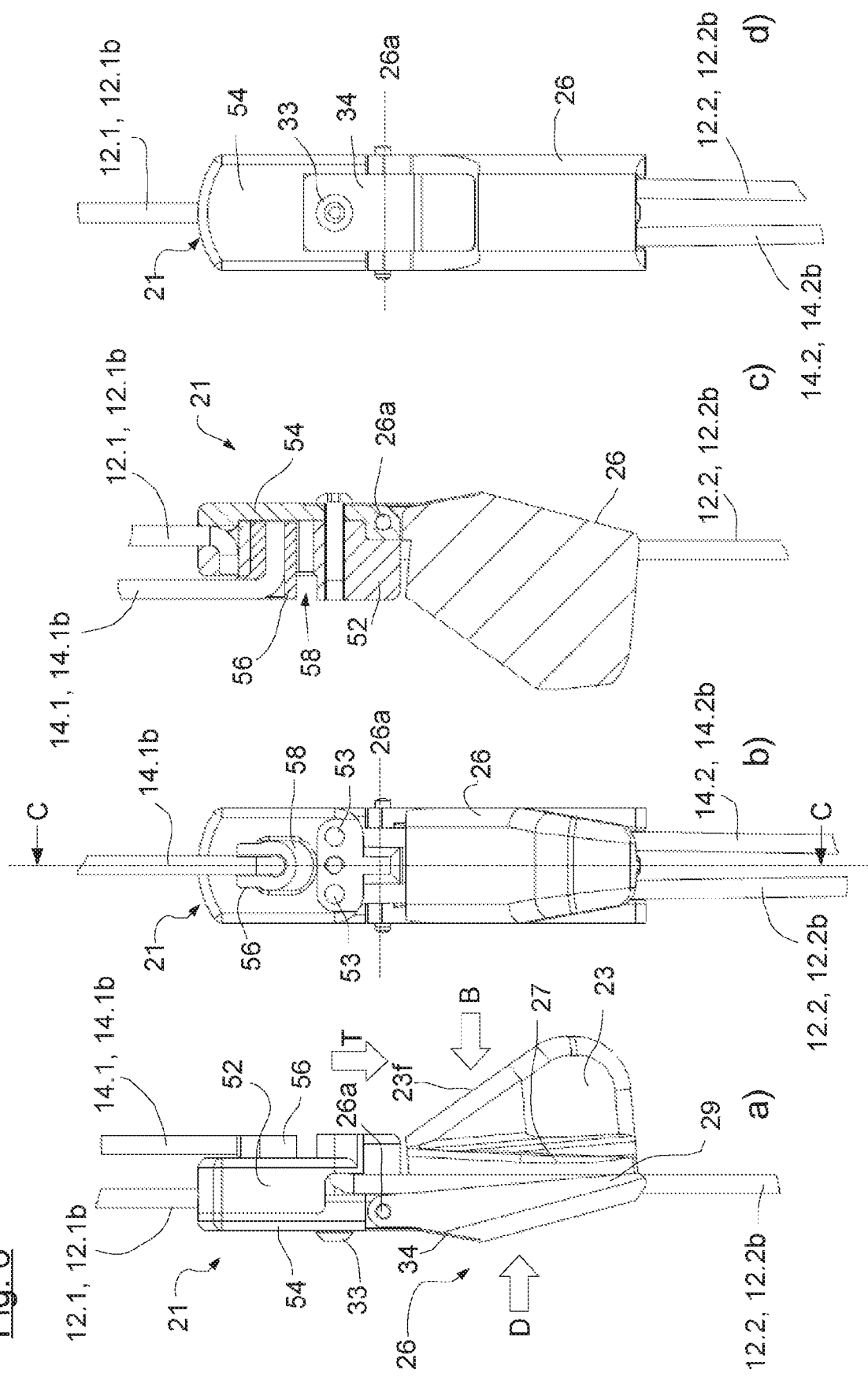

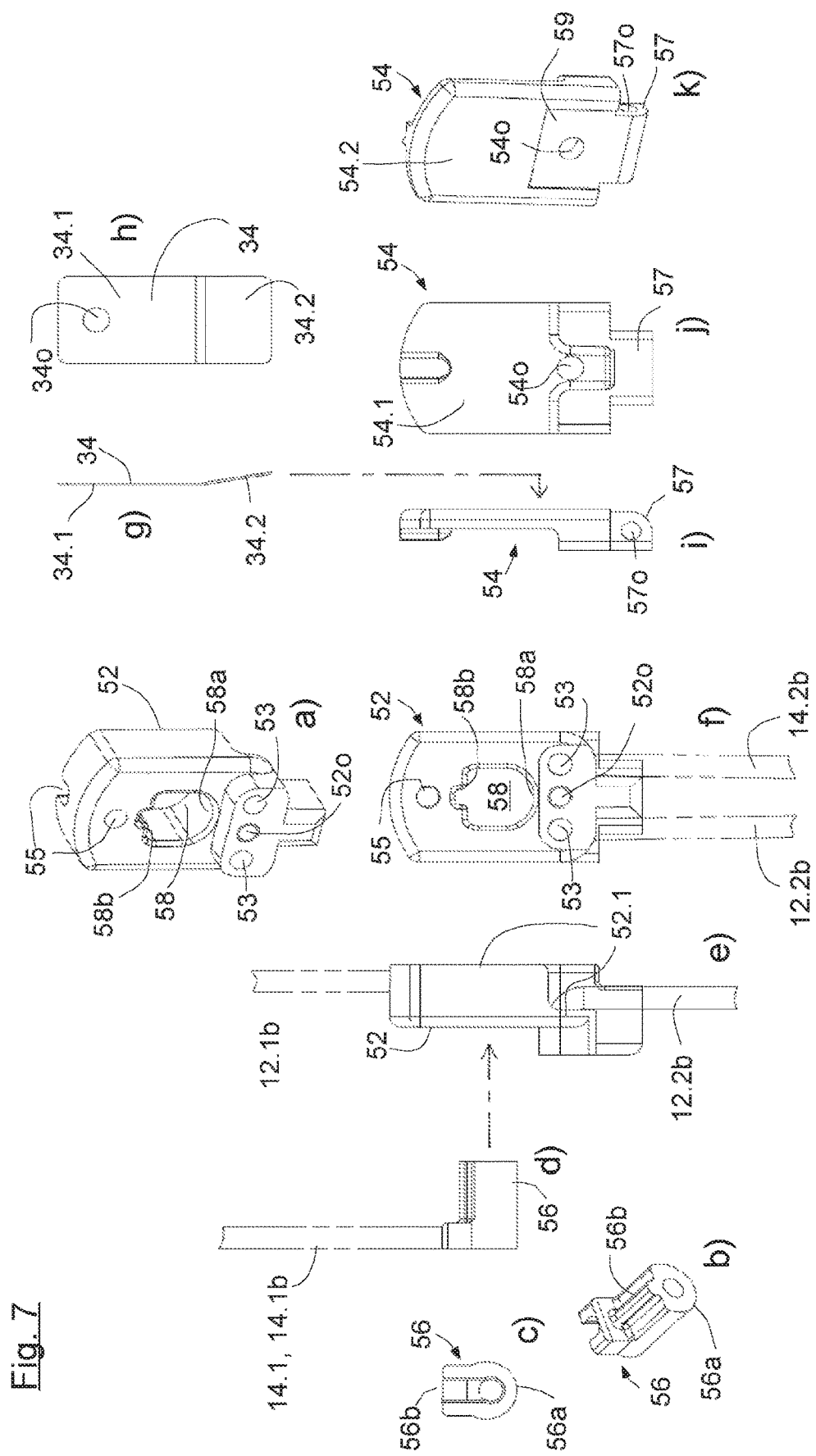

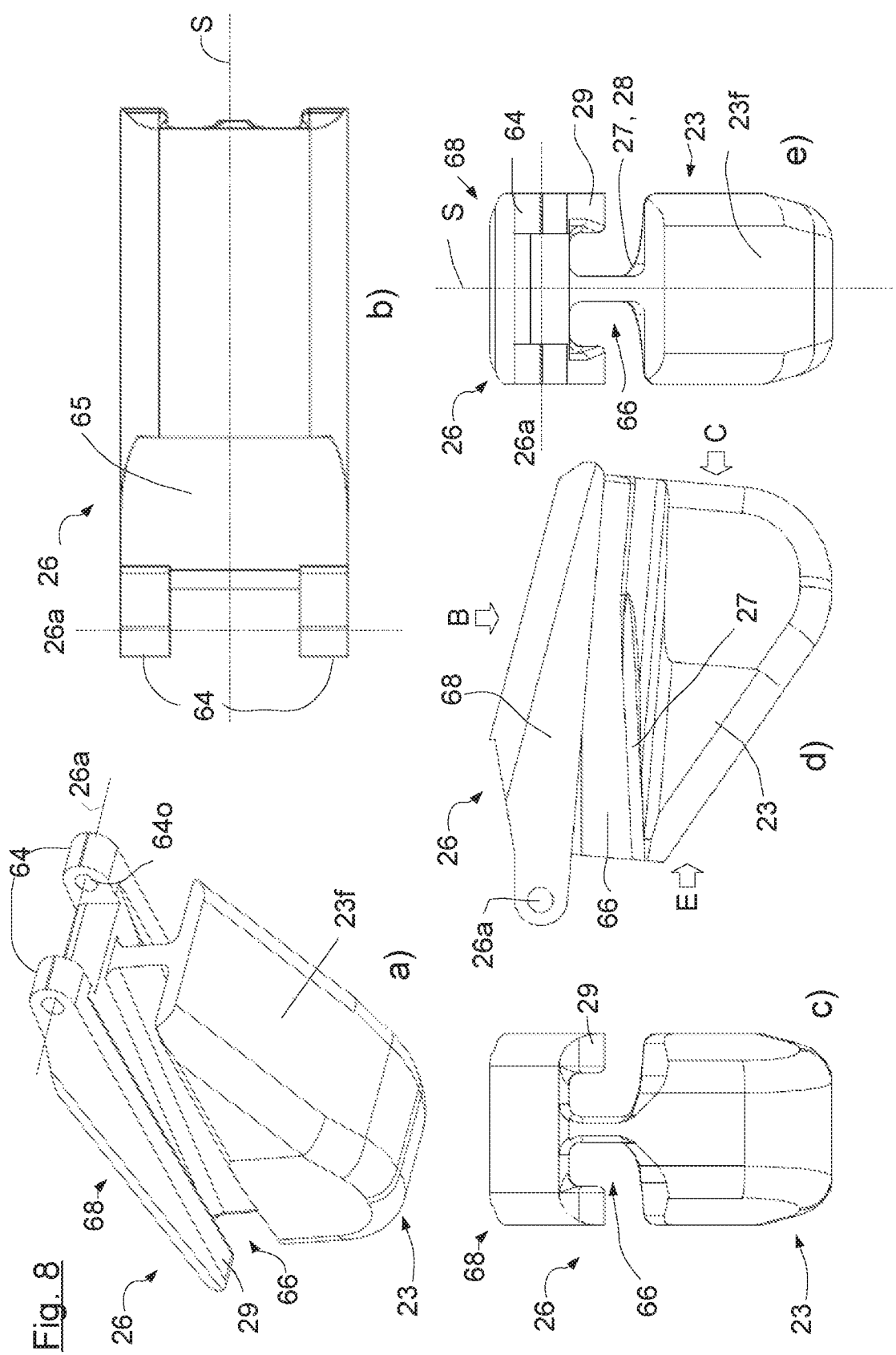

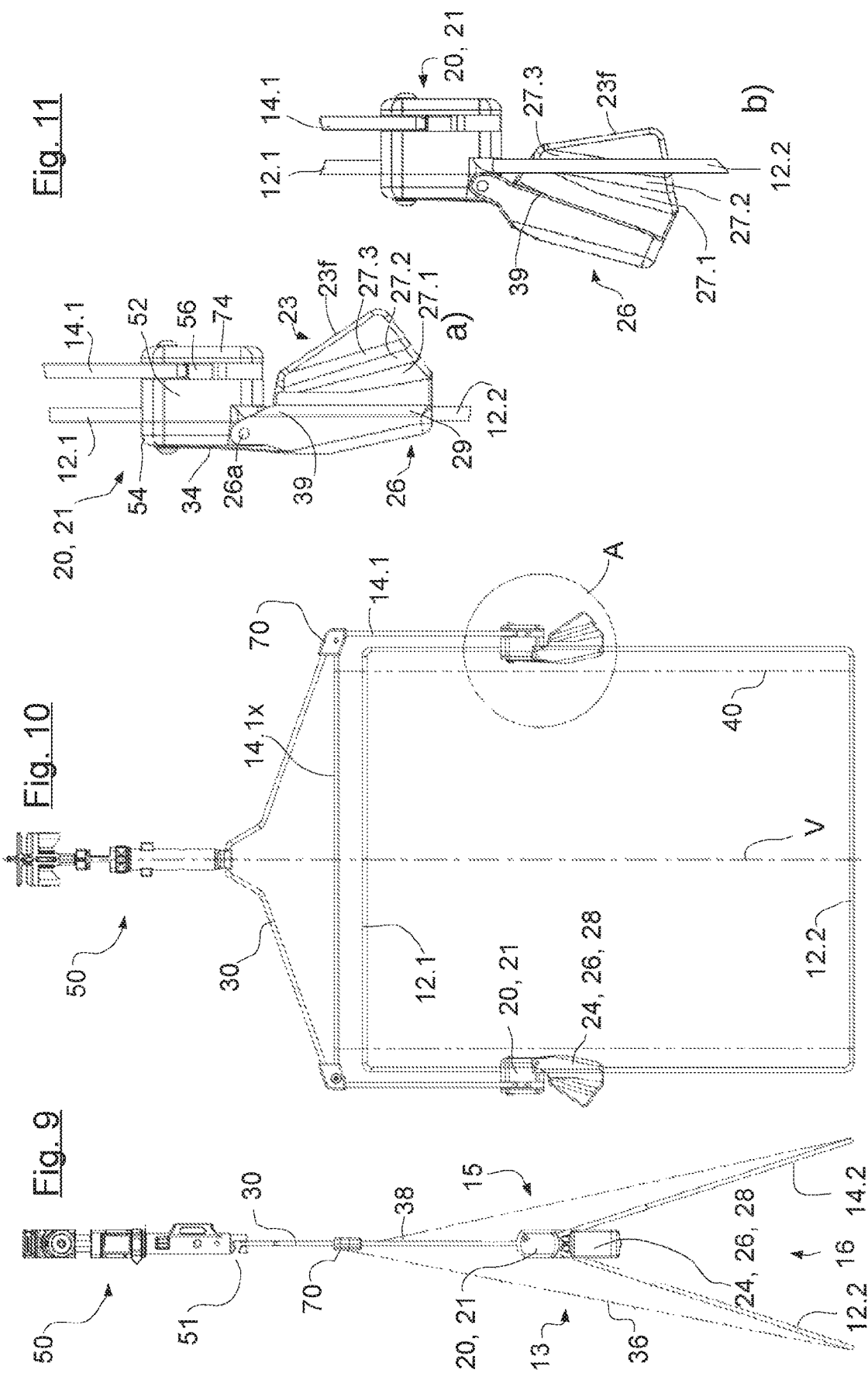

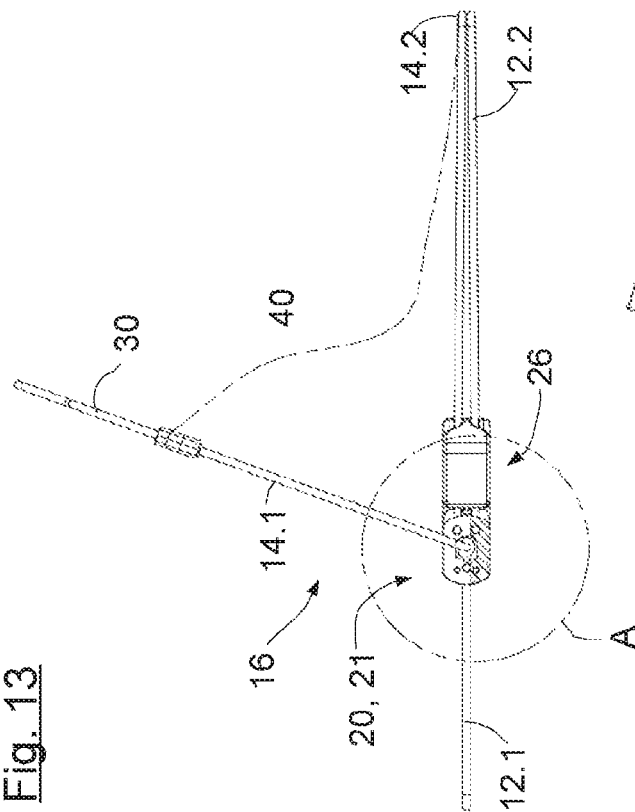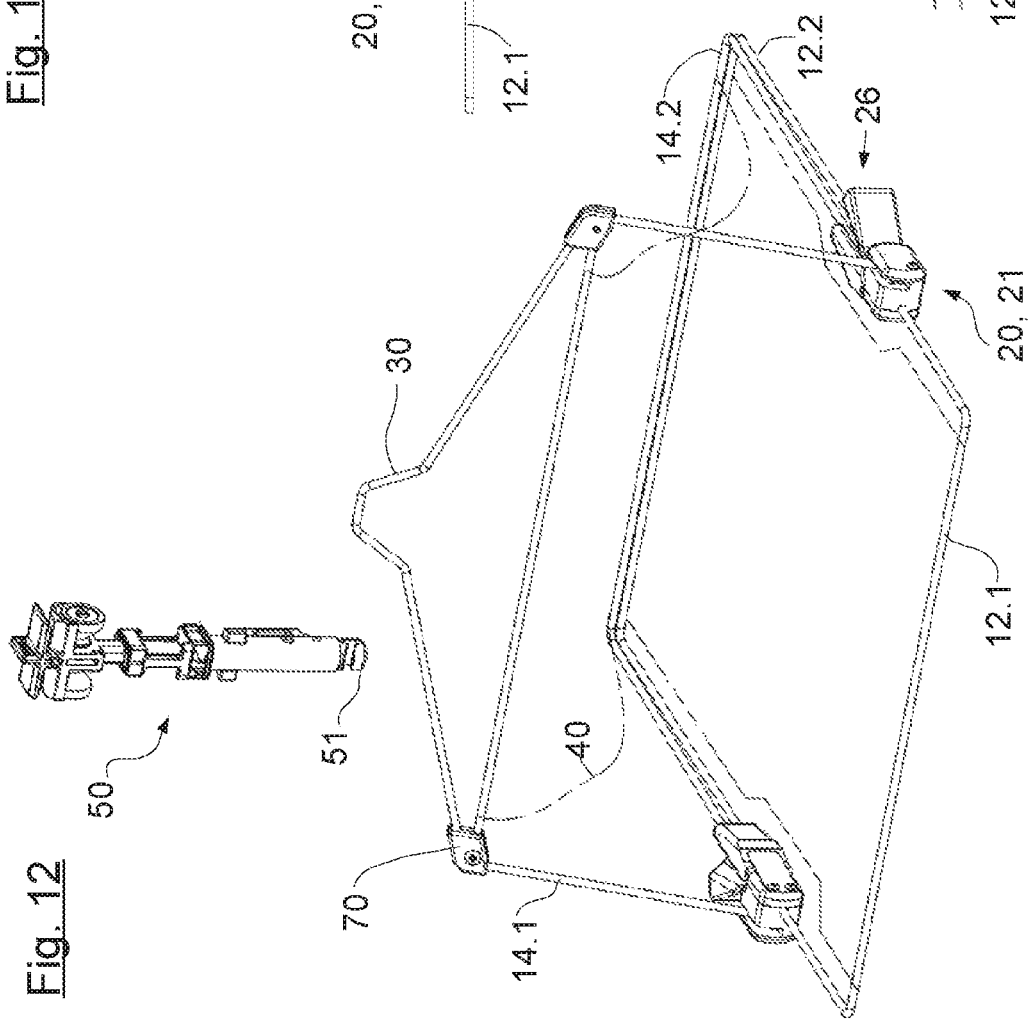

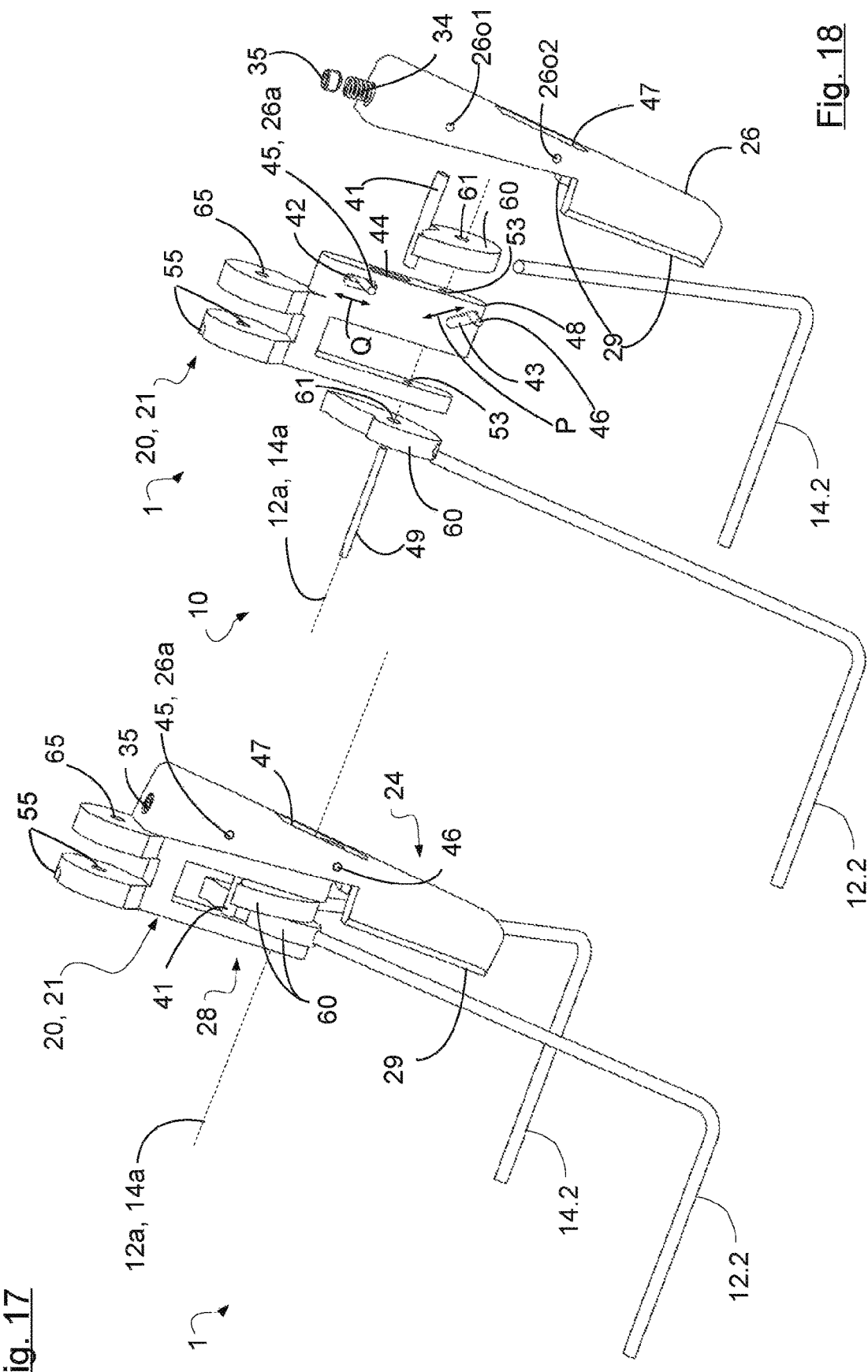

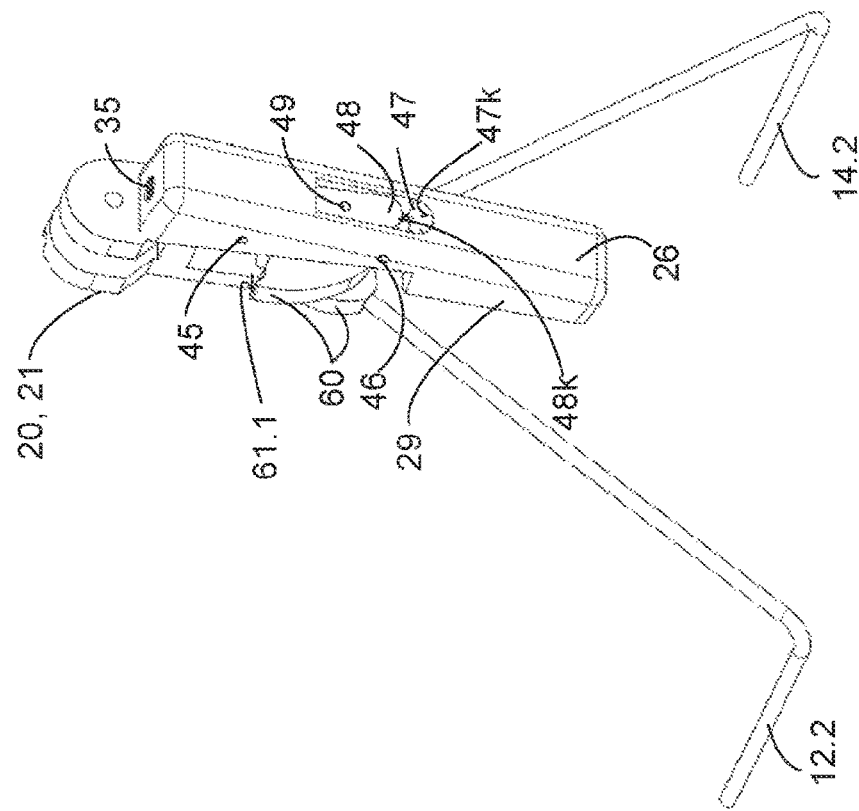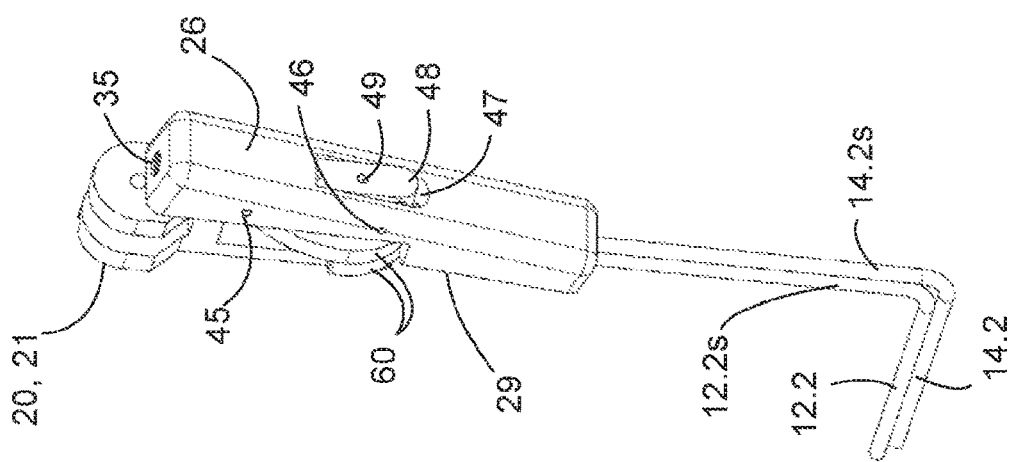
Fig. 20

HANGING BAG FRAME AND HANGING BAG

CROSS REFERENCE TO RELATED APPLICATION

This application claims priority to German Patent Application No. 10 2018 213 489.8, filed in Germany on Aug. 10, 2018, the entire contents of which are hereby incorporated herein by this reference.

TECHNICAL FIELD

The present invention relates to a hanging bag frame for a hanging bag as a conveyed material receptacle for transporting conveyed material in a suspended conveyor system.

BACKGROUND

The generic hanging bag frame further comprises a hinge mechanism with two pivot bearings, preferably in the form of two pivot bearing components, provided on opposite side edges of the hanging bag frame and pivotally supporting at least one of the lower frame parts about an associated pivot axis such that at least the lower frame parts of the first and second side wall frames can be unfolded from a closed position to an open position for opening the conveyed material receiving area.

Furthermore, the generic hanging bag frame comprises a locking mechanism with at least one locking element which is adjustable between a release position and a locked position and which is adapted, in the locked position, to lock the lower frame parts of the first and second side wall frame in the closed position, and a spreading mechanism which is adapted, during or after an adjustment of the at least one locking element(s) from the locked position into the release position, to unfold the lower frame parts from the closed position towards the open position.

Such a generic hanging bag is known for example from document EP 3090967 A2.

In the hanging bags described in the aforementioned document, the locking mechanism is provided at the lower ends of the lower frame parts, respectively, and formed, for example, by catch means or the like, while the spreading mechanism is formed by spring members provided in the area of the hinge mechanism.

SUMMARY OF THE INVENTION

The object of the present invention is to provide a generic hanging bag frame and a hanging bag equipped with it, which are relatively economical to produce.

This object is achieved according to the invention in that the at least one locking element is adjustably provided or supported on one of the pivot bearings to be adjustable between the locked position and the release position.

Particularly preferably, the spreading mechanism is provided on one of the pivot bearings or on both pivot bearings, so that the locking mechanism and the spreading mechanism are integrated on the hinge mechanism.

To reduce the number of components, it is preferably provided that the spreading mechanism is integrated on the locking element(s).

According to a preferred embodiment of the invention, it may be provided that by a displacement of the locking element from the locked position into the release position an unfolding of the lower frame parts from the closed position is automatically effected, i.e. an initial opening of the hanging bag downward. As a result, the number of movements or automated actuation movements necessary for unloading can be reduced and the unloading process can thus be simplified and accelerated.

This can be achieved through a design such that the at least one locking element comprises at least one inclined surface section designed to act on the lower frame part of the first and/or the second side wall frame during the adjustment of the locking element from the locked position to the release position such that the lower frame parts of the first and second side wall frame are unfolded from the closed position towards the open position. That is, by the unlocking movement of the locking element, an initial opening of the hanging bag downwards takes place automatically.

Preferably, the at least one locking element comprises two inclined surface sections of which the one inclined surface section acts upon the lower frame part of the first side wall frame and the other inclined surface section acts on the lower frame part of the second side wall frame when adjusting the locking element from the locked position into the release position, such that the lower frame parts are unfolded from the closed position towards the open position.

An unfolding or folding of the frame parts is preferably understood to be a corresponding pivoting movement of the two frame parts relative to the pivot bearings, but also a corresponding pivoting movement of only one frame part relative to the pivot bearings, while the other frame part does not move relative to the pivot bearings.

Generally, for the aforementioned purpose of the initial opening, a planar side wall section with a suitable inclination may be used for the lower frame part of the first and the second side wall frame. Preferably, however, multiple, in particular multiple directly adjoining, for example, planar inclined surface sections with each having a different inclination may be used in each case, or also, in each case, at least one inclined surface section with an at least partially continuously changing inclination on which the lower frame part of the first and/or the second side wall frame preferably slides along during the adjustment of the locking element from the locked position into the release position and is thereby adjusted from the closed position to the open position.

An adjusting movement which can be initiated easily both by hand and by machine can be achieved by the at least one locking element, preferably each of the locking elements, being arranged on the associated pivot bearing to be pivotable about an associated locking axis between the locked position and the release position, wherein the locking axis preferably extends substantially orthogonal to the pivot axis of the at least one lower frame part.

For locking, it may be provided that the at least one locking element or each of the locking elements comprises at least one claw section, which is designed, when the lower frame parts of the first and second side wall frame are in the closed position and the locking element is in the locked position, to overlap/reach over the lower frame part of the first and/or the second side wall frame at least partially, and thus to prevent an adjustment from out of the closed position.

Thus, the locking functions and the spreading function are preferably provided by different contours of the locking element.

In order to ensure a secure closure of the hanging bags, it may be provided that the at least one locking element or each of the locking elements is biased towards the locked position, preferably by means of a spring provided on the associated pivot bearing.

Alternatively or additionally, it may be provided to design the weight, centre of gravity and mounting of the locking element such that it returns to the locked position under the action of gravity, when the hanging bag is in the hanging transport position and no force acts from the outside on the locking element to hold it in the release position.

In this case, an automatic locking can be achieved by the locking element having at least one further inclined surface section which is designed, when the locking element is in the locked position, to be acted upon by at least one of the lower frame parts in its movement from the open position to the closed position such that the locking element moves from the locked position in the direction towards the release position. In this way, the lower frame parts can return to the closed position.

In order to enable a variable loading and unloading of the hanging bag, it is preferably provided that also the upper frame parts of the first and second side wall frame are mounted or provided on the pivot bearings of the hinge mechanism such that they can be unfolded to open the conveyed material receiving area.

In addition, it may be provided that the upper frame part of the first side wall frame is non-rotatably provided on the pivot bearings of the hinge mechanism, wherein a portion of the upper frame part of the second side wall frame is formed as an attachment means for attaching the hanging bag to a guide rail assembly of the suspended conveyor system. In this case, the upper and lower frame parts of the first side wall frame may be pivoted as a unit with respect to the upper frame part of the second side wall frame attached to the guide rail assembly to open the conveyed material receiving area, similar as shown in FIG. 2c of EP3090967. Also, an opening of the hanging bag in a horizontal state is easily possible, especially with an opening angle of up to 180°, as will be explained in more detail in connection with the description of FIG. 12.

The attachment means may also be separately formed and provided or fastened on the upper frame part of the second side wall frame.

A hanging bag with a low net weight which can be manufactured quickly and inexpensively can be formed based on brackets, preferably metal brackets, which are provided with a covering. For this purpose, it is preferably provided that the lower frame part of the first and second side wall frame each comprises a bracket member which is pivotally supported about a respective pivot axis on the pivot bearings of the hinge mechanism.

In another variant, it may be provided that the first bag side wall is formed as a one-piece, rigid element, such as in the form of a tray whose edge region then forms the side wall frame of the first bag side wall, and on whose side edges the pivot bearings are provided or formed, which pivotally support the two bracket elements for the upper and lower frame part of the second side wall frame or at least pivotally support said bracket elements after releasing a pivot lock. The two aforementioned bracket elements may in turn be provided with a covering.

According to a preferred embodiment, the upper frame part of the second side wall frame also comprises a bracket element, which is, at least after the release of a pivot lock, supported on the pivot bearings of the hinge mechanism to be pivotable about an associated pivot axis. The upper frame part of the first side wall frame may be formed by a bracket element fixed, in particular rotationally fixed, to the pivot bearings of the hinge mechanism.

For cost reasons alone, it is preferred that the at least one locking element comprises a plastic material and is preferably formed in one piece from the plastic material.

A simple assembly can be achieved by each of the pivot bearings comprising multiple composable components, of which at least two, preferably a majority or all thereof are connectable to one another by snap connections. In this way, a simple assembly is largely or completely possible without additional tools. But of course, any other connection is possible, for example by fastening means such as screws or rivets.

According to a preferred embodiment of the invention, the at least one lower frame part supported on the pivot bearings to be pivotable about the associated pivot axis may be fixedly connected to an actuating lever which is adapted to cooperate with a spreading actuating element provided on the locking element to unfold the lower frame parts when the locking element is adjusted from the locked position into the release position. By adapting the shape, length and position of the lever, the force necessary for unfolding the lower frame parts and the type of actuation by the locking element can be easily adapted to the requirements of the given case.

Preferably, the two lower frame parts are pivotally supported, more preferably about a common pivot axis, and each of the lower frame parts is preferably fixedly connected to a corresponding actuating lever.

In a suspended transport position of the hanging bag, in which the lower frame parts hang substantially vertically downwards in the closed position, it may be provided that the actuating lever(s) is/are at least partially disposed above the respective pivot axis. By this spatial separation, sufficient space for the spreading actuation of the lower frame parts by means of the locking element may be provided, without hindering the actual spreading movement.

The force required for the unfolding of the lower frame parts and the temporal course thereof can be adjusted in a simple manner in that the actuating lever has a control contour which is designed so that when the locking element is adjusted from the locked position to the release position, the spreading actuating element of the locking element slides along the control contour. The force exerted by the spreading actuating element via the control contour on the lower frame part thereby causes its unfolding movement.

In particular, stops for end positions of the spreading actuating element, which correspond, for example, to the closed position or the open position of the lower frame parts, may be provided on the control contour.

Preferably, the two lower frame parts are arranged to be pivotable about the same pivot axis on the pivot bearing and each having an actuating lever with a control contour, wherein the control contours are formed preferably axisymmetric with respect to a central axis, when viewed along the pivot axis in a side view, and are arranged so that the two lower frame parts are symmetrically unfolded by a spreading actuating element provided on the locking element, the movement of which comprises a translation along the central axis.

In order to ensure that the lower frame parts are both unlocked and unfolded by the adjusting movement of the locking element from the locked position to the release position, this adjusting movement preferably comprises or preferably is an overlapping of an unlocking movement and a spreading movement, wherein the unlocking movement causes the release of the lower frame parts and the spreading movement causes their unfolding. For example, the unlocking movement may be a pivoting movement, and the spreading movement may be a translational movement.

According to a preferred embodiment of the invention, the locking element, preferably each of the locking elements, is supported on the associated pivot bearing such that the adjustment of the locking element from the locked position to the release position comprises or is an overlapping of a pivoting movement about a locking axis and a translational movement. The locking axis preferably runs perpendicular to the pivot axis. The translational movement occurs preferably in a direction that runs vertically downwards in a hanging transport position of the hanging bag.

With regard to design, such an adjusting movement of the locking element relative to the pivot bearing can be guided in a simple manner in that on one component chosen from locking element and pivot bearing, preferably on the locking element, two guide pins are provided which are spaced apart from one another and are guided in two guide openings provided on the other component chosen from locking element and pivot bearing, preferably on the pivot bearing, for example, slot guides with a suitable shape and orientation to each other to cause the desired movement of the locking element. The guide pins preferably extend substantially perpendicular to the pivot axis of the at least one lower frame part.

By the pivoting movement, a claw section of the locking element can be brought into engagement with and out of engagement from the lower frame parts. Due to the translational movement, a spreading actuating element provided on the locking element can pivot at least one actuating lever of a lower frame part, preferably the actuating levers of both lower frame parts.

In order to prevent an object received in the hanging bag from accidentally falling downwards out of the hanging bag in the closed position of the lower frame parts, it may be provided that the two lower frame parts are dimensioned and arranged such that in the closed position and, when viewed along the pivot axis, lateral sections of the two lower frame parts overlap each other at least partially or are crossing each other. Lateral sections of the two lower frame parts are those which, in the hanging transport position of the hanging bag, are associated with lateral edge sections of the hanging bag.

Finally, protection is likewise claimed for a hanging bag comprising a hanging bag frame according to the invention or one of the above-described preferred embodiments of the invention and surface elements provided on the first and second side wall frames, preferably in the form of a covering with a film material or a textile material, so that the first side wall frame with the surface element provided thereon forms the first bag side wall of the hanging bag, and the second side wall frame with the surface element provided thereon forms the second bag side wall of the hanging bag.

BRIEF DESCRIPTION OF THE DRAWINGS

In the following, the invention will be explained in more detail with reference to preferred exemplary embodiments, which are illustrated in the accompanying figures. In the drawings:

FIG. 1 is a perspective view of a hanging bag frame or a hanging bag according to a first exemplary embodiment of the invention in the hanging transport position and in the closed state.

FIG. 2 shows the subject matter of FIG. 1 in the downwardly opened state,

FIG. 3 shows the subject matter of FIG. 2 in a front view,

FIG. 4 shows the subject matter of FIG. 2 in a side view,

FIG. 5 shows in the sub-figures a) to d) in each case an enlarged detail of one of the pivot bearings with the locking element of the hanging bag provided thereon from FIGS. 1 to 4 in different views, wherein the hanging bag is in the downwardly open state, FIG. 6 shows in the sub-figures a) to d) in each case the subject matter of FIG. 5 in the closed state of the hanging bag, wherein the views of the sub-figures a) to d) correspond to those of FIG. 5.

FIG. 7 shows in the sub-figures a) to k) different views of individual parts of which the pivot bearing components in the hanging bag frame of the first exemplary embodiment are composed, in various stages of assembly, FIG. 8 shows in the sub-figures a) to e) different views of the locking element of the hanging bag frame according to the first exemplary embodiment, FIG. 9 is a side view of a hanging bag or a hanging bag frame according to a second exemplary embodiment of the present invention in the hanging transport position and in the downwardly open state, FIG. 10 shows the object of FIG. 9 in a view from the front and in the closed state of the hanging bag or the hanging bag frame, FIG. 11 shows in the sub-figures a) and b) in each case an enlarged detail of the area designated by A in FIG. 10 in the closed and in the downwardly open state, FIG. 12 shows a perspective view of the hanging bag or the hanging bag frame of FIG. 9 in a lying position and in an upwardly open state, FIG. 13 shows a side, partial sectional view of the article of FIG. 12, FIG. 14 shows a detail enlargement of the area indicated by A in FIG. 13, FIG. 17 shows essential parts of a third exemplary embodiment of a hanging bag frame in a perspective view, wherein the lower frame parts are in the open position, FIG. 18 shows the subject-matter of FIG. 17 in an exploded view.

FIG. 20 shows in the sub-figures a) and b) a further perspective view of the subject-matter of FIG. 17, wherein the lower frame parts are in the closed position in sub-figure a) and in the open position in sub-figure b).

Figure 15:
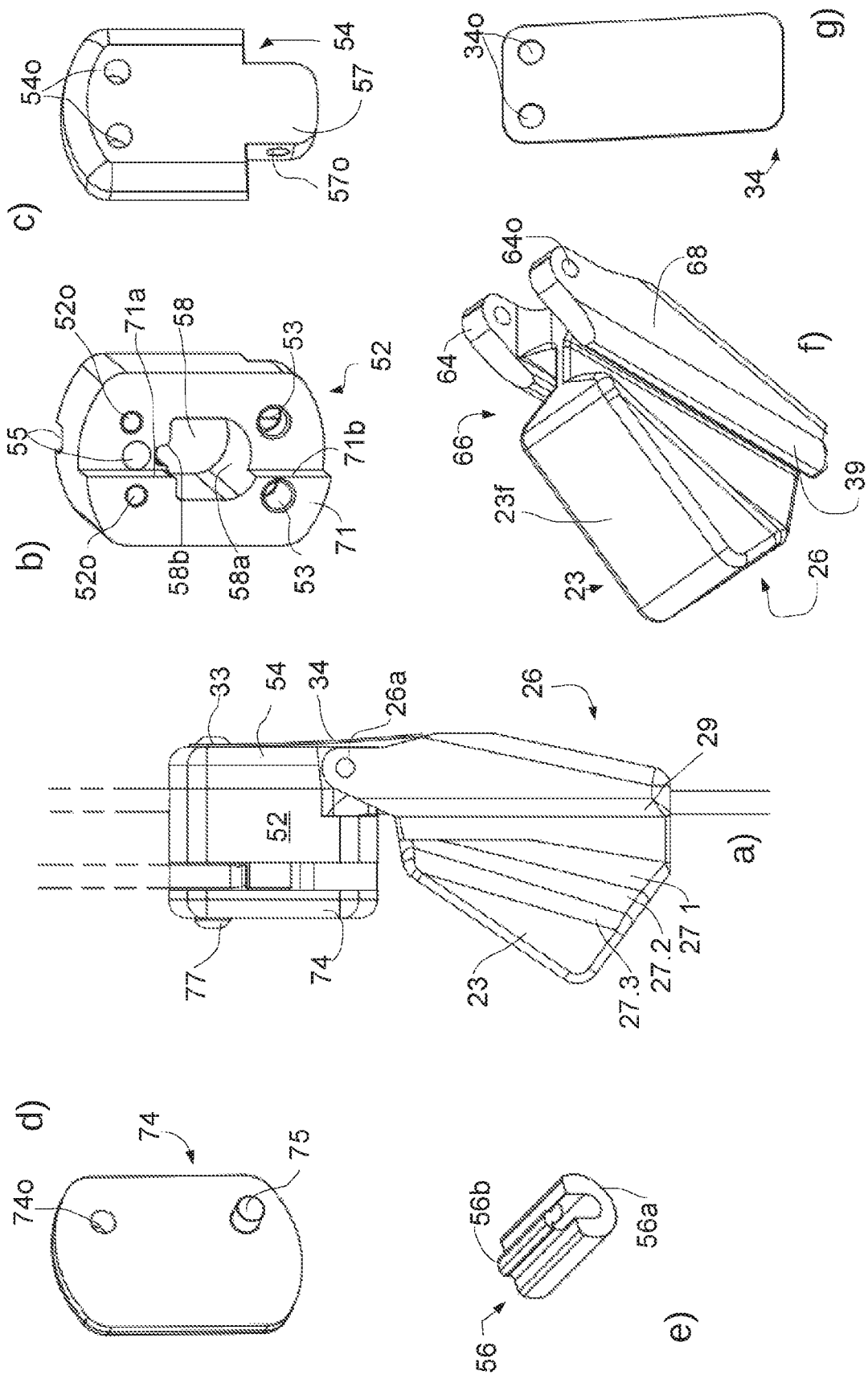
FIG. 15 shows in sub-figure a) a side view of one of the pivot bearing components with the locking element provided thereon in the closed state of the hanging bag or the hanging bag frame according to the second exemplary embodiment, and in the sub-figures b) to g) shows enlarged perspective views of individual parts of the subject-matter of the sub-figure a)

In order not to overload the figures, not all features are provided with reference numerals in every figure, but essentially only those which are important for understanding the respective figure.

DETAILED DESCRIPTION

FIG. 1 shows a perspective view of a first exemplary embodiment of a hanging bag frame 10 according to the invention for a hanging bag 1 as a conveyed material receptacle for transporting conveyed material in a suspended conveyor system not shown here.

Here, the hanging bag frame 10 and the hanging bag 1 in FIG. 1 are in the closed state and in the hanging transport position.

In the present example, the hanging bag 1 is formed from the hanging bag frame 10 and surface elements 36, 38 provided thereon (see FIG. 4) in the form of a covering 40 indicated by dashed lines, for example in FIGS. 1, 3 and 4. This may be formed, for example, from a preferably elastic film or textile material.

The hanging bag frame 10 in FIGS. 1 to 4 comprises a first side wall frame 12 for delimiting (defining) a first bag side wall 13 and a second side wall frame 14 for delimiting a second bag side wall 15, wherein the first and the second bag side wall 13, 15 opposite one another define a conveyed material receiving area 16 therebetween (see FIGS. 2 and 4).

The covering 40 may include side regions which laterally interconnect the first and second surface elements 36, 38, however, it may also be provided that the conveyed material receiving area 16 is laterally open. In addition, reference is made to the corresponding description in EP 3090967 A2.

Each of the side wall frames 12 and 14 has an upper frame part 12.1, 14.1 and a lower frame part 12.2, 14.2, which may be preferably each formed by bracket elements 12.1b, 14.1b, 12.2b, 14.2b, for example made by bent metal rods.

Unless stated otherwise, the terms "upper" and "lower" always refer to the orientation of the hanging bag in the hanging transport position shown, for example, in FIG. 1.

A portion of the upper frame part 14.1 of the second side wall frame 14 may be formed as an attachment means 30 for attaching the hanging bag 1 to a guide rail assembly of the suspended conveyor system, wherein for connecting the attachment means to the guide rail assembly a connecting means 50 (trolley) known per se and therefore not described here in more detail may be used, which allows e.g. a rotation of the hanging bag frame 10 about a vertical axis V and about a horizontal axis H (see FIGS. 3 and 4).

The upper and lower frame parts 12.1, 14.2, 12.2, 14.2 are coupled together in a flap connection area 15 by a hinge mechanism 18.

The hinge mechanism 18 comprises two pivot bearings 20, here in the form of two separate pivot bearing components 21, which are provided on opposite side edges 10s of the hanging bag frame 10.

The pivot bearings 20 or in this case the pivot bearing components 21 support the two lower frame parts 12.2, 14.2 in such a way that they are pivotable about a respectively associated pivot axis 12.2a, 14.2a (see FIG. 4) such that the lower frame parts 12.2, 14.2 can be unfolded from the closed position shown in FIG. 1 into the open position shown in FIGS. 2 to 4 for opening the conveyed material receiving area 16 and can also be folded together to close the conveyed material receiving area 16 from the open position to the closed position. The pivot axes 12.2a, 14.2a of the two lower frame parts 12.2 and 14.2 may run parallel to each other and in the hanging transport position substantially horizontally.

However, it should not be ruled out that, for example, only the lower frame part of the second side wall frame is pivotally supported on the pivot bearings, while the lower frame part of the first side wall frame is arranged rotationally fixed on the pivot bearings, for example when the first side wall does not, as in the example shown, consist of a side wall bracket consisting of two bracket elements with covering but is formed of a rigid plate whose peripheral region forms the first side wall frame.

On each of the pivot bearings 20, a locking element 26 of a locking mechanism 24 is further arranged to be adjustable between a locked position shown in FIG. 1 and a release position shown in FIG. 2.

The two pivot bearings 20 and the two locking elements 26 provided thereon are constructed identically in the present example, so that in the following only one of the pivot bearings 20 with the associated locking element 26 will be described.

In particular, the locking element 26 may be provided on the associated pivot bearing 20 or pivot bearing component 21 to be pivotable about a locking axis 26a indicated by a dashed line in FIG. 4, wherein in the illustrated exemplary embodiment, the locking axis 26a may extend perpendicular to the pivot axes 12.2a and 14.2a of the lower frame parts 12.2, 14.2 as well as substantially horizontally in the hanging transport position shown in FIGS. 1 to 4.

Structure and function of the hinge mechanism 18, the locking mechanism 24 and the spreading mechanism 28 of the hanging bag 1 according to the exemplary embodiment of FIGS. 1 to 4 are explained in more detail below with reference to FIGS. 5 and 6, which show in the sub-figures a) to d), respectively, detail enlargements of a pivot bearing 20 with locking element 26 provided thereon in different views.

In detail, the sub-figures a) each show a detail enlargement of the area designated by A in FIG. 3. The sub-figures b) each show the subject matter of the sub-figures a), viewed in the direction denoted by B there. The sub-figures c) each show a sectional view of the subject matter of the sub-figures b) along the section plane designated by C-C there, and the sub-figures d) each show the subject matter of the sub-figures a), viewed in the direction denoted by D there.

FIGS. 5 and 6 differ only in that in FIG. 6 the locking element 26 is in the locked position and the lower frame parts 12.2, 14.2 are in the closed position, while in FIG. 5 the locking element 26 is in the release position and the lower frame parts 12.2, 14.2 are in the open position.

The locking element 26 is designed to, in the locked position, lock the lower frame parts 12.2, 14.2 of the first and second side wall frames 12, 14 in the closed position, as shown for example in FIGS. 1 and 6.

When the lower frame parts 12.2, 14.2 are in the closed position and the locking element 26 is in the locked position, two claw sections 29 of the locking element 26 partially overlap (reach over) the lower frame part 12.2, 14.2 of the first and second side wall frames 12, 14 in such a manner that they prevent the lower frame parts from being displaced out of the closed position (compare FIG. 6a).

From the closed position shown in FIG. 1 or FIG. 6a, the hanging bag 1 according to the illustrated exemplary embodiment can be easily be moved into the downwardly open position shown in FIG. 2 or FIG. 5 by hand or by machine by the two locking elements 26 each being pivoted about the locking axes 26a from the locked position inwards or toward each other to the release position.

For this purpose, each of the locking elements 26 may have an actuating section 23 with an actuating surface 23f which preferably slopes downwards and outwards in the locked position. The actuating section 23 may protrude in the locked position on the respective side edge 10s of the hanging bag frame 10 outwardly in the direction of the pivot axes 12.2a, 14.2a from the frame, so that it is easy to grasp, and the slope of the actuating surface 23f allows a downward actuating movement, for example in the direction of the arrow T in FIG. 6a).

By adjusting the locking elements 26 from the locked position to the release position, the lower frame parts 12.2 and 14.2 are also unfolded from the closed position to the open position by two inclined surface sections 27 provided for this purpose on each locking element 26, wherein the frame parts 12.2, 14.2 can slide along on the inclined surface sections 27.

In this way, when unlocking, at the same time and automatically, an initial downward opening of the hanging bag frame 10 and the hanging bag 1 also takes place, for which only a short action on the actuating surfaces 23f is necessary.

It may namely be provided that a complete opening of the hanging bag 1 downward occurs by the sliding out or falling out of a conveyed material received in the hanging bag and not shown in the figures.

In the present exemplary embodiment, the locking elements 26 can each be biased toward the locked position by a spring 34, for example a leaf spring, which is likewise provided on the associated pivot bearing component 21 by a fastening means 33.

It may happen that the locking elements 26 return to the locked position before the lower frame parts 12.2, 14.2 return to the closed position after emptying of the hanging bag 1 under the influence of their own weight, such as when an emptying due to the size and/or shape of the conveyed material takes a long time.

In order to enable an automatic closing and locking of the hanging bag 1 in this case, it may be provided that the locking elements 26 have further inclined surface sections 39 (cf., FIG. 5a) which are designed, when the locking elements 26 are in the locked position, to be acted upon by the lower frame parts 12.2, 14.2 during their movement from the open position to the closed position, so that the locking elements 26 move so far out of the locked position in the direction towards the release position that the lower frame parts 12.2, 14.2 can return to the closed position.

As can be seen from the sectional views of the sub-FIGS. 5c) and 6c), the pivot bearing components 21 are each constructed from multiple components which can be assembled together and may each comprise a bearing part 52, a cover part 54 and a pivot lock insert 56.

The bearing part 52 of the pivot bearing component 21, which is also shown separately in the sub-figures a), e) and f) of FIG. 7, has in its lower end region two lower pivot bearing openings 53, which are used for the pivotable supporting of the bent ends of the lower bracket elements 12.2b, 14.2b and define the pivot axes 12.2a, 14.2a.

Between the two lower pivot bearing openings 53, a further passage opening 52o may be located in the bearing part, which serves to receive the fastening means 33 fixing the bearing part 52, the cover part 54 and the spring 34 to each other.

Alternatively or in addition to the fastening with the fastening means, the bearing part 52 and the cover part 54, for example, may be connectable to one another by a latching connection or clip connection, so that they can be assembled purely by hand, i.e. without additional tools.

Furthermore, the bearing part 52 in its upper end region has an L-shaped receptacle 55, in which the bracket of the upper frame part of the first side wall frame can be inserted so that it is connected fixedly to the pivot bearing component 21 after the bearing part 52 has been connected to the cover part 54.

In a central region, the bearing part 52 has a pivot lock opening 58 which, together with the pivot lock insert 56 to be inserted therein, forms a releasable pivot lock 32 for the upper frame part 14.1 of the second side wall frame 14.

This acts similar to the ratchet joint described in EP 3090967. Both the pivot lock opening 58 and the pivot lock insert 56 have a pivot area 58a, 56a and a ratchet area 58b, 56b. The pivot lock insert 56 is vertically slidably received in the pivot lock opening 58 in the assembled state.

The assembly of the pivot lock insert 56 with the inserted upper frame part 14.1 of the second side wall frame 14 on the bearing part 52 is indicated by the dashed arrow between the sub-FIGS. 7d) and 7e).

In the suspended transport position of the hanging bag 1, the ratchet areas 58b, 56b are, due to the weight of the hanging bag 1, in a positive engagement with one another, which prevents pivoting of the upper frame part 14.1 of the second side wall frame 14 relative to the pivot bearing component 21.

However, by raising the pivot bearing components 21 relative to the upper frame section 14.1 of the second side wall frame 14, the pivot lock insert 56 provided thereon may be displaced in the pivot lock opening 58 such that the ratchet areas 56b, 58b disengage from each other and the pivot lock insert 56 and pivot lock opening 58 abut each other with their respective pivot areas 58a, 56a, which allows a pivoting of the upper frame part 14.1 of the second side wall frame 14 relative to the pivot bearing component 21. In addition, reference is made to the description of the ratchet joint in EP 3090967.

The substantially plate-shaped cover part 54, which is also shown separately in different views in the sub-FIGS. 7i), 7j) and 7k), serves to secure the bracket elements 12.1b, 12.2b and 14.2b, which are merely inserted into corresponding openings of the bearing part 52, against falling out, and also serves to pivotally support the locking element 26. For this purpose, a central bearing extension 57 having a passage opening 57o is provided at the lower end of the cover part 54.

The surfaces 52.1 and 54.1 of the bearing part 52 and the cover part 54 facing one another in the assembled state are designed so that the lower frame parts 12.2, 14.2 can be unfolded to a predetermined maximum angle, while the upper frame part 12.1 of the first side wall frame 12 is non-rotatably received by the pivot bearing components 21. Reference is made in particular to the sub-FIGS. 7a), 7e) and 7j).

On the surface 54.2 of the cover part 54, which faces away from the bearing part 52 in the assembled state, a receiving recess 59 for receiving the leaf spring 34 is provided. Finally, the cover part 54 has a further passage opening 54o in the region of the receiving recess 59 for receiving the fastening means 33.

The spring 34, which is again shown separately in a side view and a plan view in the sub-FIGS. 7g) and 7h), is a leaf spring with a substantially rectangular shape and has a first section 34.1 with a passage opening 34o and a second section 34.2 slightly bent relative to the first section. In the assembled state, the first section 34.1 abuts the cover part 54 and is fixed there by means of the fastening means 33, while the second section 34.2 abuts an application portion 65 of the locking element 26 and biases it towards the locked position. The assembly of the spring 34 on the cover part 54 is indicated by the dashed arrow between the sub-FIGS. 7g) and 7i).

The locking element 26 is again shown separately in different views in the sub-FIGS. 8a) to 8e). Sub-FIG. 8a) shows a perspective view, sub-FIG. 8d) shows a side view, and sub-FIGS. 8b), 8c) and 8e) each show a view of the subject-matter from sub-FIG. 8d), viewed in the direction designated there by arrows B, C and E, respectively.

The locking element 26 of the hanging bag frame 10 according to the exemplary embodiment may preferably be made in one piece, for example of a plastic material.

In the present exemplary embodiment, the locking element 26 is preferably mirror-symmetrical with respect to the symmetry plane S indicated in FIGS. 8b) and 8e).

In addition to the already described actuating section 23, the locking element preferably comprises two bracket-receiving sections 66 and a bearing section 68.

Here, the bracket-receiving sections 66 are designed for receiving the bracket elements 12.2b and 14.2b in the closed state of the lower frame parts 12.2, 14.2 and in the locked position of the locking element 26 (see FIG. 6a).

The bearing section 68 may have two bearing projections 64 with passage openings 64o to receive the locking member 26 on the associated bearing component 21 so that it is pivotable about the locking axis 26a.

On the side of the bearing section 68, which faces the actuating section 23, the two claw sections 29 are formed, which serve as described above, for locking the lower frame parts in the closed position.

In the boundary region between the bracket receiving section 66 and the actuating section 23, the inclined surface sections 27 are provided which form the spreading mechanism 28 of the hanging bag frame 10.

Different contours of the locking element 26 thus fulfil the functions of the locking mechanism 24 and the spreading mechanism 28 in the present preferred exemplary embodiment.

FIGS. 9 to 16 illustrate a hanging bag 1 or a hanging bag frame 10 or parts thereof according to a second exemplary embodiment of the invention.

For features of the further embodiments that correspond to those of the first exemplary embodiment, the same reference numerals are used, and the other embodiments are substantially described only in so far as they differ from the first exemplary embodiment, the above description of which is otherwise explicitly referenced.

As shown in FIGS. 9, 10 and 12, in the second exemplary embodiment, in contrast to the first exemplary embodiment, the attachment means 30 of the hanging bag frame 10 is not permanently coupled to the connection means 50 but can be hooked into a hook-shaped lower fastening end 51 of the connection means and be separated from this again through slight lifting, which is illustrated in FIG. 12.

In order to facilitate the fastening of the covering 40 to the upper frame part 14.1 of the second side wall frame 14, in the second exemplary embodiment the attachment means 30 is formed separately from the bracket element 14.1b of the upper frame part 14.1 of the second side wall frame 14 and fastened by two fastening means 70 at the two upper corners of the upper frame part 14.1. Alternatively, it would also be possible to form the attachment means 30 integrally with the side parts of the upper frame part 14.1 and to connect an additional horizontal transverse strut 14.1x by the two fastening means 70 to the attachment means 30 in order to then fix the covering 40 to the transverse strut 14.1x.

Since the upper frame part 12.1 of the first side wall frame 12 is non-rotatably supported on the pivot bearing components 21 in the second exemplary embodiment just as in the first exemplary embodiment, after releasing the pivot lock, the upper frame part 12.1 and the lower frame part 12.2 of the first side wall frame 12 can be pivoted as a unit and together with the lower frame part 14.2 of the second side wall frame with respect to the upper frame part 14.1 of the second side wall frame attached, for example, to the guide rail assembly to open the conveyed material receiving area 16 upwards.

Alternatively, as illustrated in FIGS. 12 to 14, the hanging bag 1 can be separated from the connecting means 50 and can be placed on a horizontal surface, not shown here, and then the upper frame part 14.1 of the second side wall frame 14 can be pivoted upward with respect to the pivot bearing components 21 and the rest of the hanging bag 1 to open the conveyed material receiving area 16. In particular, pivoting the upper frame part 14.1 of the second side wall frame over an angular range of up to 180° is possible.

In order to allow a defined opening of the hanging bag by up to 180°, the pivot bearing components 21 of the second exemplary embodiment are slightly modified from those of the first exemplary embodiment.

In particular, the bearing part 52 of the pivot bearing component 21 shown again separately in sub-FIG. 15b) in the second exemplary embodiment, has a step-like projection 71 with two stop surfaces 71a and 71b, where the upper frame part 14.1 of the second side wall frame 14 comes to rest in the fully closed position or in the position opened by 180°.

Furthermore, the pivot bearing components 21 of the second exemplary embodiment, in contrast to those of the first exemplary embodiment, comprise an additional, substantially plate-shaped cover member 74, which is shown separately in sub-FIG. 15d) and which secures the upper frame part 14.1 of the second side wall frame 14 to the outside against accidental release from the pivot bearing component 21.

The additional cover part 74 can be attached onto the bearing part 52 in such a way that a pin-shaped fastening projection 75 integrally provided on the cover part 74 is inserted into an extension of the lower pivot bearing opening 53 in the stepped projection 71.

In the second exemplary embodiment, in contrast to the first exemplary embodiment, for fastening the individual components to each other, not only one but two passage openings 34o, 54o, 52o are provided in the spring 34, in the cover member 54 and the bearing member 52 respectively, through each of which a fastening means 33 can be inserted.

Also, in the second exemplary embodiment, the passage openings of the cover part and bearing part are not provided in the lower but in the upper region of the respective component, in the case of the bearing member 52 for example at the same height with one end of the L-shaped receptacle 55 for the upper frame part 12.1 of the upper side wall frame (see FIG. 15b)).

One of the passage openings 52o in the bearing part 52 may continue in the step-like projection 71 and serve for fastening the additional cover part 74 by means of an additional fastening means 77, for which a corresponding passage opening 74o may also be provided in the additional cover part 74.

Figure 16:
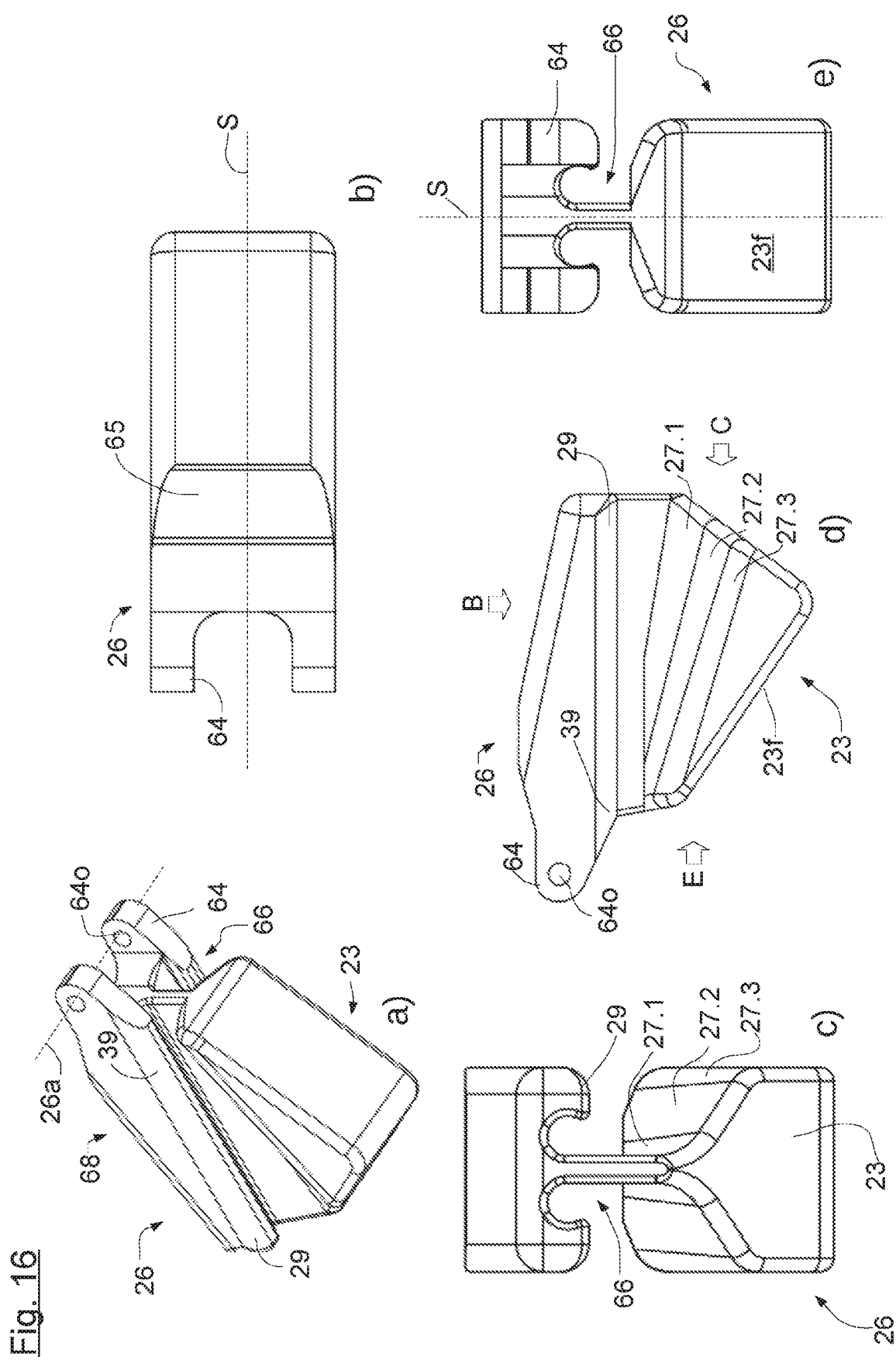
FIG. 16 shows in the sub-figures a) to e) different views of the locking element of the hanging bag frame according to the second exemplary embodiment.
Figure 19:
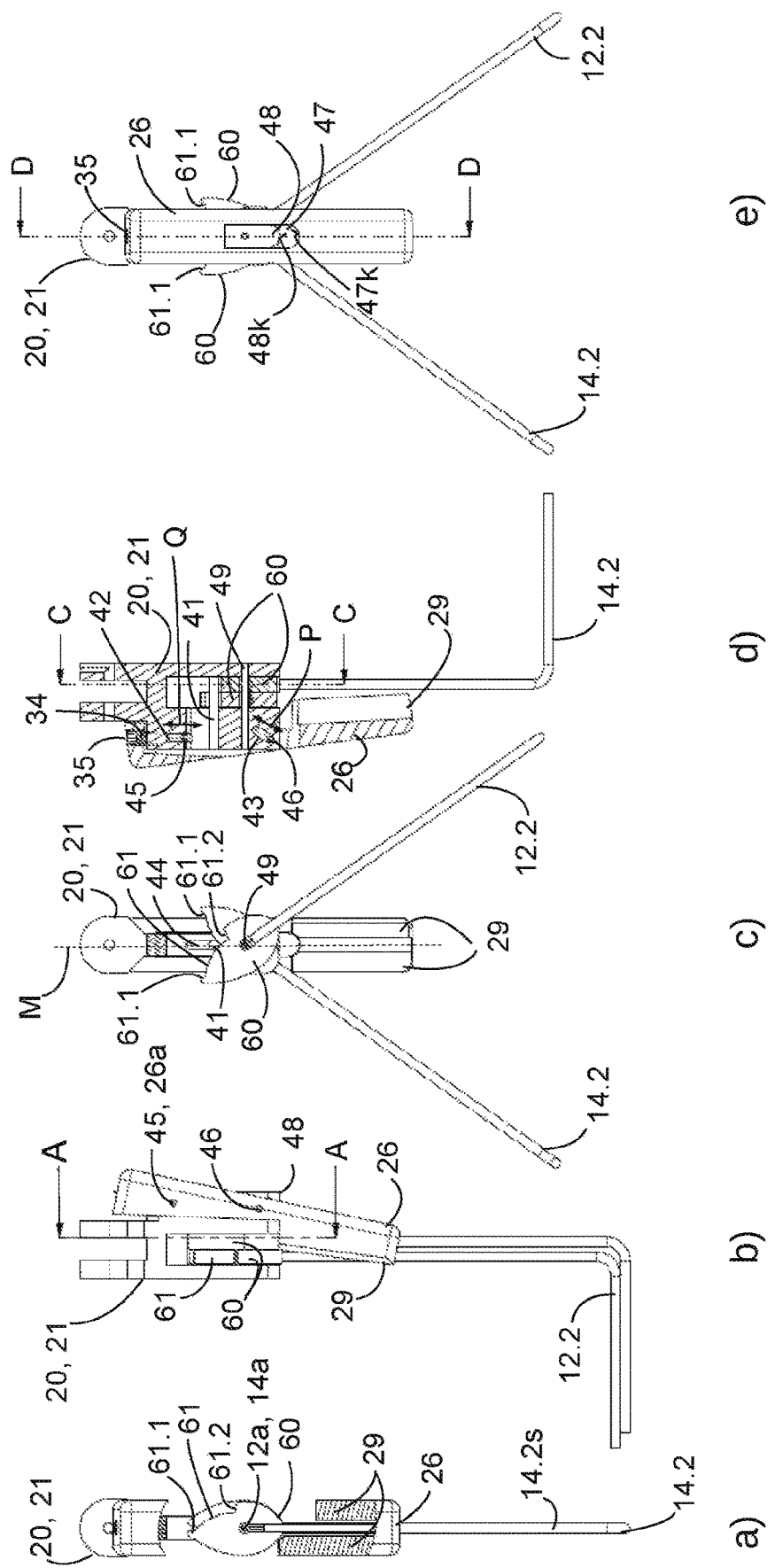
FIG. 19 shows in the sub-figures a) to e) the subject matter of FIG. 17 in different views, wherein the lower frame parts are in the closed position in the sub-figures a) to b), in the open position in the sub-figures c) to e), and wherein the sub-figures a), c) and d) are sectional views of the subject-matter of the sub-figures b), d) and e) along the cutting plane designated there by A-A, C-C or D-D.

Also, the locking element 26 of the second exemplary embodiment, which is shown in FIG. 16 separately in different views in the sub-figures a) to e), which correspond to those of the respective sub-figures of FIG. 8, is slightly modified with respect to the locking element of the first exemplary embodiment.

In particular, three inclined surface sections 27.1, 27.2 and 27.3 with different inclinations are provided for each of the two lower frame parts, allowing a softer initial opening than the inclined surface portions 27 of the first exemplary embodiment which are slightly smaller with respect to surface.

In addition, the further inclined surface portions 39 of the second exemplary embodiment serving for self-locking are also significantly more pronounced than those of the first exemplary embodiment.

The two above-described exemplary embodiments essentially differ in three aspects: (a) in the coupling of the connecting means, (b) in the construction and shape of the pivot bearing components and (c) in the form of the locking element. It is understood that these three aspects are essentially independent of each other, so that the two variants of these three aspects shown can be combined in any desired manner.

FIGS. 17 to 20 show essential parts of a third exemplary embodiment of a hanging bag according to the invention, showing in each case the lower frame parts 12.2, 14.2 and one of the pivot bearing 20 with the locking element 26 mounted thereon. On both side edges of the hanging bag frame, similar pivot bearings and locking elements are preferably provided.

The third exemplary embodiment differs from the previous exemplary embodiments essentially by the configuration of the locking mechanism 24 and the pivot mechanism 28.

First, the general structure will be explained with reference to FIGS. 17 and 18.

The two lower frame parts 12.2 and 14.2 may be similar bracket elements as in the first two exemplary embodiments, which may be provided with a suitable covering, which is not shown here. At the two ends, the lower frame parts 12.2, 14.2, in contrast to the first exemplary embodiments, are in each case fixedly connected to an actuating lever 60.

These actuating levers 60 are formed in the present example as plate-like components having a passage opening 61 for an axle pin 49, which defines in this example the pivot axes 12a, 14a of the two lower frame parts 12.2, 14.2, which coincide here.

With reference to a central axis M indicated in FIG. 19c), the two actuating levers 60 are constructed and arranged in an axisymmetrical manner when viewed in a side view along the pivot axis 12a, 14a and each have a curved control contour 61 with two end stops 61.1 and 61.2.

The control contour 61 is located in a section of the actuating lever 60 which is arranged above the pivot axis 12a, 14a in the hanging transport position of the hanging bag with the lower frame parts 12.2, 14.2 in the closed position (see FIG. 19a)).

The two lower frame parts 12.2, 14.2 are pivotally supported by means of the actuating lever 60 and the axle pin 49 on the pivot bearing 20 shown, which is presently in the form of a pivot bearing component 21 formed in one piece. However, if desired, it could be constructed from a number of composable parts, as in the previously described examples.

In addition to pivot bearing openings 53 for the axle pin 49 and thus for the two lower frame parts 12.2, 14.2, an L-shaped receptacle 55, for example, for the upper frame part (not shown here) of the first side wall frame and another pivot bearing opening 65, for example, for the upper frame part (also not shown) of the second side wall frame, the pivot bearing component 21 may further have three guide openings 42, 43 and 44, which are best seen in the exploded view of FIG. 18. These are each slot guides with different orientations, which are described in more detail below.

By way of two guide pins 45, 46 which are guided in the guide openings 42, 43 of the pivot bearing 20 and which are fastened to the locking element 26 in openings 2601 and 2602, the locking element 26 is supported on the pivot bearing 20 to be adjustable between the locked position shown in FIG. 19b) and the release position shown in FIG. 19d) and is biased towards the locked position by a spring 34. The spring 34 may be clamped, for example, with a screw 35 between the pivot bearing component 21 and the locking element 26.

The upper guide pin 45 defines in this example the pivot axis 26a of the locking element 26. In contrast to the first two exemplary embodiments, however, the pivot axis 26a in the third exemplary embodiment is not stationary with respect to the pivot bearing 20 but is displaceable along a direction Q indicated by a double arrow in FIG. 18, the direction Q being defined by the orientation of the associated guide opening 42.

The guide opening 43 extends in a first approximation also in a linear manner and is oriented with respect to the direction Q obliquely along a direction P, and it defines, together with the guide opening 42, the course of the adjusting movement of the locking element 26. It is clear that the shape and course of the guide openings 42, 43 are to be selected such that in these the guide pins 45, 46 can be guided, which are fixedly provided on the locking element 26 and thus have a fixed distance from one another.

Furthermore, in an outwardly laterally facing surface of the locking element 26, an elongated passage opening 47 is provided, through which, at least in the locked position of the locking element 26, a section 48 of the pivot bearing 20 can protrude (see FIG. 19b)). In this case, the contours 47k, 48k of the passage opening 47 and of the section 48 may be matched to one another, as can be seen in particular from FIG. 19e).

The locking or unlocking of the hanging bag downwards occurs in the third exemplary embodiment also by pivoting the locking element 26 about the locking axis 26a, whereby claw portions 29 provided on the locking element 26 are brought into engagement or out of engagement with the two lower frame parts 12.2, 14.2, so that they are prevented from being adjusted from the closed position or released.

In contrast to the first two exemplary embodiments, however, the adjustment movement of the locking element 26 in the third exemplary embodiment also comprises a translational movement along the direction Q (see FIGS. 18 and 19d)) in addition to the above-mentioned pivoting movement.

During this translational movement, an actuating bolt provided on the locking element 26 slides as a spreading actuating element 41 along the control contours 61 of the actuating levers 60, thereby unfolding the lower frame parts 12.2 14.2 away from one another in the manner of a pair of scissors. The spreading actuating element 41 is preferably immovably connected to the locking element 26 and guided in the guide opening 44 along the direction Q.

The course of the opening movement of the lower frame parts 12.2, 14.2 is determined by the course of the control contours 61, among other things. The end stops 61.1 and 61.2 define the end positions of the spreading actuating element 41 and thus of the lower frame parts 12.2, 14.2.

A self-locking of the lower frame parts may be provided in the third exemplary embodiment as well, for example by suitable inclined surface portions of the locking element 26, as described in more detail for the first two exemplary embodiments.

In all exemplary embodiments, the hanging bag can be unlocked and thereby opened by a simple downward actuation of the locking elements 26, which in particular allows automated unloading with a small foot print.

As shown in FIG. 19a), the two lower frame parts 12.2, 14.2 may be dimensioned and arranged such that in the closed position and when viewed along the pivot axis 12*a*, 14*a*, lateral sections 12.2*s*, 14.2*s* of the two lower frame parts 12.2, 14.2 overlap each other. Thus, in the illustrated view, the lower frame part 12.2 of the first side wall frame may be completely covered by the lower frame part 14.2 of the second side wall frame and may be accommodated therein.

In particular, if the pivot axes 12*a*, 14*a* do not coincide differently than shown, the lateral sections of the lower frame parts may at least partially overlap one another in the above-mentioned view, preferably in a lower end area.

As shown in FIG. 20*a*), in the closed position and when viewed along the pivot axis 12*a*, 14*a*, lateral sections 12.2*s*, 14.2*s* of the two lower frame sections 12.2, 14.2 may even slightly crossing each other. In all of these cases, the risk of an object received in the bag accidentally falling down out of the bag, even if it is a very flat object, can be minimized.

In addition, it is pointed out that the manner indicated in FIGS. 17 to 20 for supporting the two upper frame parts in the L-shaped receptacle 55 and the pivot bearing opening 65 of the third exemplary embodiment is chosen only as an example.

In particular, the locking and spreading mechanism of the lower frame parts of the third embodiment may be combined with any type of form and bearing of the upper frame parts, in particular with the type described in the first two exemplary embodiments.

The hanging bag according to the invention is, due to the bracket construction, light in weight, is easy and quick to build, and can be used in many ways. In particular, an automated unloading of the hanging bag downward can be implemented in a simple manner and with minimal space requirements.

The invention claimed is:

1. A hanging bag frame for a hanging bag as conveyed material receptacle for transporting conveyed material in a suspended conveyor system, wherein the hanging bag frame comprises:
    first and second side wall frames for delimiting, a first and a second bag side wall, which, facing each other, delimit a conveyed material receiving area therebetween, wherein each of the side wall frames has an upper and a lower frame part,
    a hinge mechanism with two pivot bearings, which are provided on opposite side edges of the hanging bag frame and pivotally support at least one of two lower frame pails about an associated pivot axis, such that at least the lower frame parts of the first and second side wall frame are unfoldable from a closed position to an open position for opening the conveyed material receiving area,
    a locking mechanism with at least one locking element which is adjustable between a release position and a locked position and adapted to lock, in the locked position, the lower frame parts of the first and second side wall frame in the closed position, and
    a spreading mechanism which is designed, during or after an adjustment of the at least one locking element from the locked position into the release position, to unfold the lower frame parts from the closed position to the open position,
    wherein the at least one locking element is provided or supported on one of the pivot bearings to be adjustable between the locked position and the release position, and wherein a displacement of the locking element from the locked position into the release position causes an unfolding of the lower frame parts from the closed position, whereby the unfolding automatically results in an initial opening of the hanging bag downward.

2. The hanging bag frame according to claim 1, wherein the spreading mechanism is also provided on one of the pivot bearings or on both pivot bearings.

3. The hanging bag frame according to claim 2, wherein the at least one locking element comprises at least one inclined surface section designed to act on the lower frame part of the first or the second side wall frame during the adjustment of the locking element from the locked position to the release position such that the lower frame parts of the first and the second side wall frame are unfolded from the closed position towards the open position.

4. The hanging bag frame according to claim 2, wherein at least one of the locking elements is supported on the associated pivot bearing to be pivotable about a locking axis between the locked position and the release position, wherein the locking axis extends substantially orthogonal to the pivot axis of the at least one lower frame part.

5. The hanging bag frame according to claim 1, wherein the at least one locking element or each of the locking elements comprises at least one claw section, which is designed, when the lower frame parts of the first and second side wall frame are in the closed position and the locking element is in the locked position, to overlap the lower frame part of the first and/or the second side wall frame at least partially and thus to prevent an adjustment from out of the closed position.

6. The hanging bag frame according to claim 1, wherein the at least one locking element or each of the locking elements is biased towards the locked position.

7. The hanging bag frame according to claim 6, wherein the locking element has at least one further inclined surface section which is designed, when the locking element is in the locked position, to be acted upon by at least one of the lower frame parts in its movement from the open position to the closed position such that the locking element moves from the locked position in the direction towards the release position.

8. The hanging bag frame according to claim wherein the at least one locking element comprises a plastic material.

9. The hanging bag frame according to claim 8, wherein each of the pivot bearings comprises a plurality of composable components, of which at least two can be connected to one another by snap connections.

10. The hanging bag frame according to claim 1, wherein the at least one lower frame part that is supported on the pivot bearings to be pivotable about the associated pivot axis is fixedly connected to an actuating lever which is adapted to cooperate with a spreading actuating element provided on the locking element to unfold the lower frame parts when the locking element is adjusted from the locked position to the release position.

11. The hanging bag frame according to claim 10, wherein in a suspended transport position of the hanging bag, the actuating lever is arranged at least partially above the pivot axis.

12. The hanging bag frame according to claim 10, wherein the actuating lever has a control contour which is designed such that during the adjustment of the locking element from the locked position to the release position, the spreading actuating element of the locking element slides along the control contour.

13. The hanging bag frame according to claim 1, wherein at least one of the locking elements is mounted on the associated pivot bearing such that the adjustment of the locking element from the locked position to the release position, comprises a superposition of a pivoting movement about a locking axis and a translational movement.

14. The hanging bag frame according to claim 1, wherein the two lower frame parts are dimensioned and arranged such that in the closed position and in a view along the pivot axis, lateral sections of the two lower frame parts overlap each other at least partially or are crossing each other.

15. The hanging bag frame according to claim 1, further comprising:
 surface elements provided on the first and the second side wall frames, such that the first side wall frame with the surface element provided thereon forms the first bag side wall of the hanging bag, and the second side wall frame with the surface element provided thereon forms the second bag side wall of the hanging bag.

16. The hanging bag frame according to claim 2, wherein the spreading mechanism is integrated on the locking element.

17. The hanging bag frame according to claim 6, wherein the at least one locking element or each of the locking elements is biased towards the locked position by means of a spring provided on the associated pivot bearing.

18. The hanging bag frame according to claim 1, wherein the at least one locking element is produced in one piece from a plastic material.

19. The hanging bag according to claim 15, wherein the surface elements comprise a covering with a film material or a textile material.

* * * * *